United States Patent
Stark

(10) Patent No.: US 10,031,754 B2
(45) Date of Patent: *Jul. 24, 2018

(54) KICK-STARTED RUN-TO-COMPLETION PROCESSOR HAVING NO INSTRUCTION COUNTER

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 895 days.

This patent is subject to a terminal disclaimer.

(21) Appl. No.: 14/267,298

(22) Filed: May 1, 2014

(65) Prior Publication Data
US 2015/0317160 A1 Nov. 5, 2015

(51) Int. Cl.
G06F 9/30 (2018.01)
G06F 9/38 (2018.01)
G06F 9/32 (2018.01)

(52) U.S. Cl.
CPC ............ *G06F 9/30145* (2013.01); *G06F 9/30* (2013.01); *G06F 9/3001* (2013.01); *G06F 9/3004* (2013.01); *G06F 9/30047* (2013.01); *G06F 9/30072* (2013.01); *G06F 9/32* (2013.01); *G06F 9/322* (2013.01); *G06F 9/3802* (2013.01); *G06F 9/3867* (2013.01); *G06F 9/3879* (2013.01)

(58) Field of Classification Search
None
See application file for complete search history.

(56) References Cited

U.S. PATENT DOCUMENTS

| 5,442,125 A * | 8/1995 | Hanzawa | G10H 7/002 84/602 |
| 5,574,927 A * | 11/1996 | Scantlin | G06F 9/30036 703/23 |
| 2009/0006696 A1* | 1/2009 | Henmi | G06F 13/24 710/262 |

\* cited by examiner

*Primary Examiner* — John Lindlof
(74) *Attorney, Agent, or Firm* — Imperium Patent Works LLP; T. Lester Wallace; Mark D. Marrello

(57) ABSTRACT

A pipelined run-to-completion processor includes no instruction counter and only fetches instructions either: as a result of being prompted from the outside by an input data value and/or an initial fetch information value, or as a result of execution of a fetch instruction. Initially the processor is not clocking. An incoming value kick-starts the processor to start clocking and to fetch a block of instructions from a section of code in a table. The input data value and/or the initial fetch information value determines the section and table from which the block is fetched. A LUT converts a table number in the initial fetch information value into a base address where the table is found. Fetch instructions at the ends of sections of code cause program execution to jump from section to section. A finished instruction causes an output data value to be output and stops clocking of the processor.

26 Claims, 7 Drawing Sheets

MANY SMALL SECTIONS OF SPECIALIZED CODE

ONE SECTION OF CODE

OCTETS IN ONE 128-BIT BLOCK

FETCH INSTRUCTION WHERE THE OFFET IS A VALUE IN THE INITIAL FETCH INFO

FETCH INSTRUCTION WHERE THE OFFET IS
A VALUE IN THE INPUT DATA VALUE

FETCH INSTRUCTION WHERE THE OFFET IS
IN A SPECIFIED REGISTER

77
OPCODE
(7-BITS)

FETCH THE NEXT 128-BIT BLOCK OF INSTRUCTIONS AFTER THE
LAST INSTRUCTION FETCHED. THE MEMORY IS THE SAME
MEMORY FROM WHICH THE LAST INSTRUCTION WAS FETCHED.

FETCH MORE INSTRUCTION

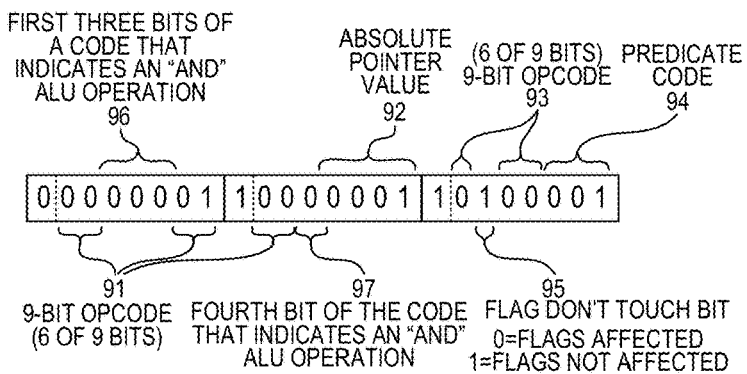

ABSOLUTE POINTER VALUE POINTS TO A PARTICULAR REGISTER OF THE STACK. THE CONTENT OF THIS REGISTER IS ADDED TO THE VALUE POPPED OFF THE STACK, AND THE RESULT IS WRITTEN BACK INTO THE PARTICULAR REGISTER OF THE STACK. THE OPERATION IS ONLY PERFORMED IF THE PREDICATE IS TRUE. DO NOT CHANGE THE VALUE OF THE FLAGS.

POP STACK ABSOLUTE INSTRUCTION

FIG. 9

| P | P | P | DESCRIPTION |
|---|---|---|---|
| 0 | 0 | 0 | ZERO FLAG IS SET |
| 0 | 0 | 1 | ANY FLAG IS SET |
| 0 | 1 | 0 | CARRY FLAG IS SET AND ZERO FLAG IS CLEAR |
| 0 | 1 | 1 | ALWAYS |
| 1 | 0 | 0 | NOT (ZERO FLAG IS SET) |
| 1 | 0 | 1 | NOT (ANY FLAG IS SET) |
| 1 | 1 | 0 | NOT ( CARRY FLAG IS SET AND ZERO FLAG IS CLEAR) |
| 1 | 1 | 1 | NOT (ALWAYS) |

PREDICATE CODES INDICATED BY THE PREDICATE BITS

FIG. 10

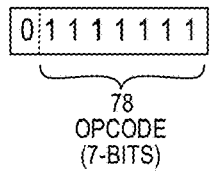

78
OPCODE
(7-BITS)

EXECUTION OF THE FINISHED INSTRUCTION CAUSES THE FINISHED SIGNAL TO BE ASSERTED, THE CONTENTS OF THE REGISTER FILE TO BE OUTPUT FROM THE PROCESSOR AS THE "OUTPUT DATA", AND THE PROCESSOR TO STOP CLOCKING.

FINISHED INSTRUCTION

FIG. 11

STATE DIAGRAM OF THE CLOCK CONTROL
AND PIPELINE CONTROL STATE MACHINE

TABLE NUMBER TO BASE ADDRESS
LOOKUP TABLE CIRCUIT

US 10,031,754 B2

KICK-STARTED RUN-TO-COMPLETION PROCESSOR HAVING NO INSTRUCTION COUNTER

TECHNICAL FIELD

The described embodiments relate generally to pipelined run-to-completion processors.

SUMMARY

In a first novel aspect, a pipelined run-to-completion processor includes no instruction counter and only fetches instructions either: as a result of being prompted from the outside by an incoming input data value and/or an incoming initial fetch information value, or as a result of execution of a fetch instruction. Due to the lack of an instruction counter and the associated control circuitry which can be substantial, the pipelined run-to-completion processor can be realized in a small amount of integrated circuit area. In one example, the pipelined run-to-completion processor is implemented in about ten thousand equivalent gates.

Initially the pipelined run-to-completion processor is stopped and is not clocking. An initial fetch information value and/or input data value is supplied to the processor. The initial fetch information value and/or input data value kick-starts the processor into clocking and causes the processor to do an initial fetch of a block of instructions, where the block of instructions is one block of many in a section of code. There are typically many sections of code in a table of code. There are many such tables of code stored in an external memory.

In a second novel aspect, which particular block of instructions it is (of which particular section, or which particular table) that is fetched is determined by the input data value and/or the initial fetch information value. In one specific embodiment, a lookup table circuit in the processor converts a table number value in the initial fetch information value into a base address value, where the base address value is the address in the memory where the table starts. The offset from the base address of the table to the beginning of the section of code may be specified by a part of the initial fetch information value and/or by a part of the input data value, or the offset can be derived from such parts of the initial fetch information value and/or input data value. Fetch instructions at the ends of sections of code cause program execution to jump from section to section and/or from table to table. At the end of a program is a special "finished" instruction. Execution of this finished instruction causes an output data value to be output from the processor and causes clocking of the processor to stop.

In a third novel aspect, the incoming input data value and/or initial fetch information value causes the run-to-completion processor to start clocking, and execution of a finished instruction causes the run-to-completion processor to stop clocking.

In a fourth novel aspect, the pipelined run-to-completion processor executes a novel pop stack absolute instruction. The pop stack absolute instruction includes an opcode, an absolute pointer value, a "flag don't touch" bit, and predicate bits. A register file of the processor is used as a stack. A data value is stored in the register file, with a data value portion (a portion of the larger data value) being stored in a particular register of the register file. If a condition indicated by the predicate bits is not true, then an operation of the instruction is not performed. If the condition is true, then the stack of the processor is popped thereby generating an operand A. The absolute pointer value identifies the particular register of the stack. The identification of the register is not relative to a stack pointer or to the top of the stack, but rather the identification is "absolute" in that the absolute pointer value points to a specific register independent of the value of a stack pointer or which register is the top of the stack. The data value portion stored in this identified particular register is then used as an operand B. The arithmetic logic operation specified by the opcode of the instruction is performed using operand A and operand B thereby generating a result, and the data value portion in the particular register of the stack is replaced with the result. If the "flag don't touch bit" is set to a particular value, then the flag bits (carry flag and zero flag) are not affected by execution of the instruction.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a diagram of a pop stack absolute instruction.

FIG. 10 is a table illustrating the meaning of predicate bits in the instruction of FIG. 9.

FIG. 11 is a diagram of a finished instruction.

DETAILED DESCRIPTION

Reference will now be made in detail to background examples and some embodiments of the invention, examples of which are illustrated in the accompanying drawings.

Figure 1:
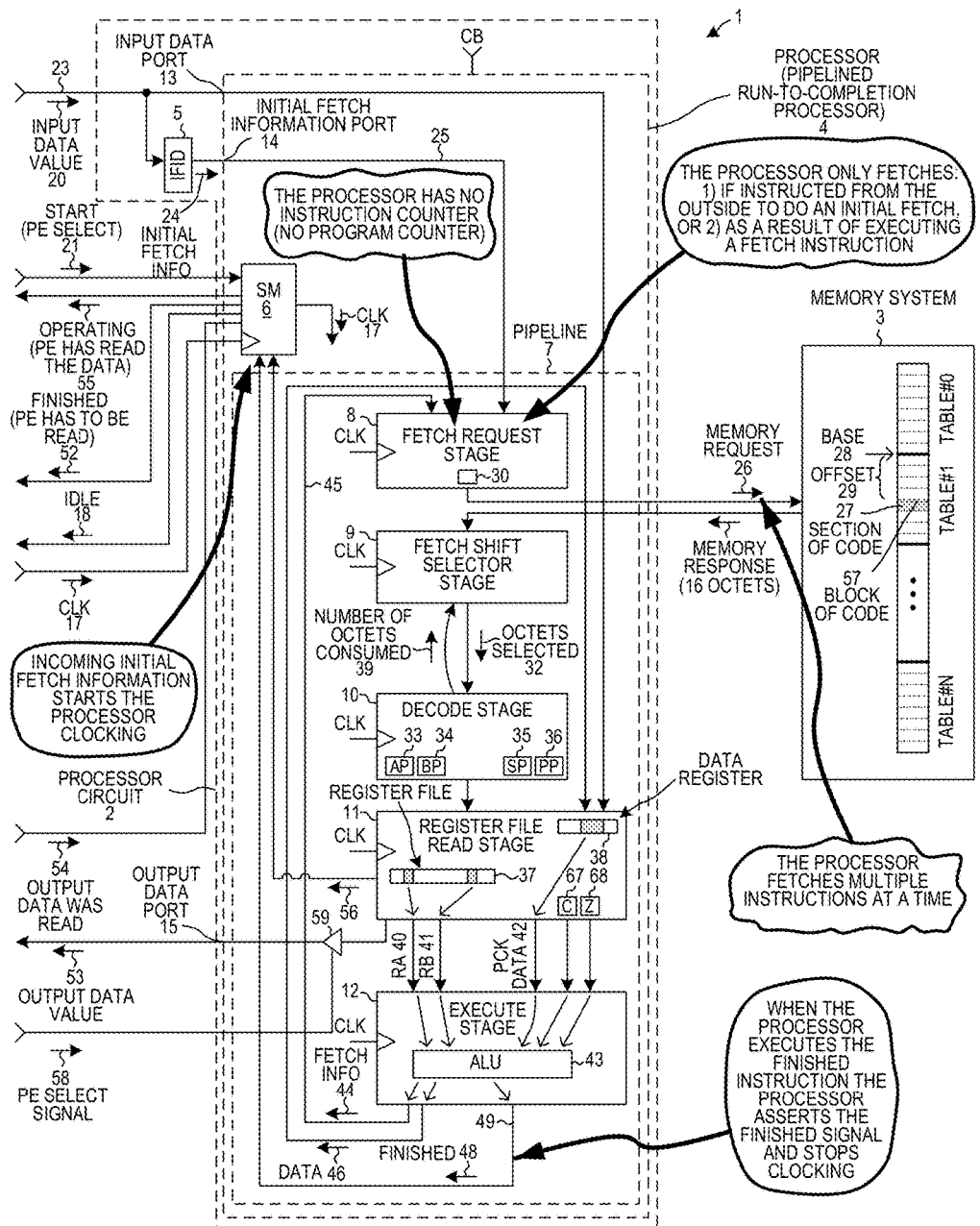
FIG. 1 is a diagram of system 1 involving a pipelined run-to-completion processor 4 in accordance with one novel aspect.

FIG. 1 is a high-level block diagram of a system 1 including a processor circuit 2 and a memory system 3 in accordance with one novel aspect. The processor circuit 2 includes a pipelined run-to-completion processor 4 and an initial fetch information determination circuit 5. The pipelined run-to-completion processor 4 includes a clock control state machine 6 and a pipeline 7. The pipeline 7 includes a fetch request stage 8, a fetch shift selector stage 9, a decode stage 10, a register file read stage 11, and an execute stage 12. The pipelined run-to-completion processor 4 receives input data values from an external circuit via input data port 13, and receives initial fetch information values via initial fetch information port 14, and outputs output data values to an external circuit via output data port 15.

Initially, the state machine 6 is in the idle state 16. The pipeline is clocked by the clock signal CLK 17. In the idle state, the state machine disables the clock signal CLK. The pipeline 7 is therefore not being clocked, and power consumption of the processor 4 is reduced. In the idle state, the state machine 6 also outputs the idle signal 18 via conductor 19. An external circuit external to the processor then supplies an input data value 20 onto the input data port 13 of the processor and asserts the start signal 21 (also referred to as the "PE select signal"). The input data port 13 in this case is a set of conductors that extends from outside the processor and to the register file read stage 11. The asserting of the start signal 21 informs the processor that the input data value 20 on the input data port 13 is available to be read. In response to the assertion of the start signal 21, the state machine transitions to the enable clock signal state 22. The transition of the state machine to the enable clock signal state 22 enables the pipeline 7 by supplying the clock signal CLK 17 to the pipeline 7. At the same time that the input data value is being supplied to the processor via conductors 23 and the input data port 13, an initial fetch information value 24 is supplied to the processor 4 via conductors 25 and initial fetch information port 14. In the present example, the initial fetch information determination circuit 5 includes a characterizer circuit and a Ternary Content Addressable Memory (TCAM). The characterizer is an amount of combinatorial logic that receives the input data value, characterizes various parts of the input data value, and generates therefrom a set of flag values. The value of a particular flag as output by the characterizer indicates whether the input data value has a corresponding particular characteristic. If, for example, the input data value 20 is an IPv4 network packet, then this characteristic is detected by the characterizer and the characterizer assert an IPv4 flag (the IPv4 flag is set), otherwise the characterizer does not assert the IPv4 flag (the IPv4 flag is cleared). There are many flags output by the characterizer, with each different flag indicating whether the input data value has a corresponding different characteristic. The flags as output by the characterizer are supplied to inputs of the TCAM. Depending on the values of the flags determined from the input data value 20, the TCAM outputs a multi-bit value (referred to as the "input fetch information value") onto the initial fetch information port 14 of the processor circuit 2.

The fetch request stage 8 generates memory requests that are supplied to the external memory system 3. The fetch request stage 8 can only output a memory request in response to either: 1) an incoming input data value and/or an incoming initial fetch information value, or 2) a fetch information value supplied to the fetch request stage as a result of execution by the pipeline of a fetch instruction. In the present example, both an incoming input data value is being supplied to the pipeline as well as an associated initial fetch information value. The incoming input data value 20 and/or initial fetch information value 24 prompts the pipeline 7 to issue a memory request 26. The memory request 26 is communicated to the external memory system 3. As explained in further detail below, the memory request 26 is a request to read one 128-bit word 57 from the memory, where the address of the 128-bit word 57 is given by a base address value 28 and an offset value 29. The 128-bit word 47 is located at the beginning of a section 27 of code. A 128-bit word is also referred to here as a "block of information". The memory of the memory system 3 is organized as a set of uniquely addressable 128-bit words. The base address value identifies the beginning of a table, TABLE#1 in this case, of code. The offset value identifies an offset from the base address 28 at the beginning of the table to the beginning of the section 27 of code. The external memory system 3 stores many such tables of code. The tables in FIG. 1 are denoted TABLE#0, TABLE#1, to TABLE#N.

In one specific example, the particular section 27 of code that the processor is prompted to fetch within table TABLE#1 depends on the initial fetch information value 24. The particular table as well is determined by the initial fetch information value 24. The initial fetch information value 24 includes a table number value. The fetch request stage 8 includes a table number to base address lookup circuit 30. The table number value is supplied to the lookup table circuit 30, and the lookup table circuit 30 outputs the base address value for the table. The base address value is then incorporated into the actual memory request 26.

The memory system 3 responds by returning to the processor circuit 2 a memory response 31. The memory response 31 includes one 128-bit block of information at the beginning of the identified section 27 of code. The 128-bit block of information 57 contains sixteen octets. The 128-bit block of information 47 includes a plurality of instructions, where an instruction can involve one, two or three octets, depending on the type of instruction. The number of instructions in a 128-bit block is therefore variable. The 128-bit block of information 57 is received by the fetch shift selector stage 9. The fetch shift selector stage 9 stores the 128-bit block of information 57, and then outputs three octets, where the particular octets output are for the next instruction to be consumed by the pipeline. Immediately after the fetch of the 128-bit block 57, it is the first, second and third octets of the 128-bit block that are output from the fetch shift selector stage 9.

The decode stage 10 receives the selected octets 32, and decodes the instruction. Based on the instruction, the decode stage 10 loads an A register pointer AP 33, a B register pointer BP 34, carry flag bit C 67, zero flag bit Z 68, a stack pointer SP 35, and a packet pointer PP 36. The A register pointer AP 33 identifies one register (8-bit portion) of a register file 37 in the register file read stage 11. This identified 8-bit portion contains the value of the A register for the instruction to be executed. The B register pointer BP 34 identifies another register (8-bit portion) of the register file 37 that contains the value of a B register for the instruction to be executed. The stack pointer SP 35 identifies one register (8-bit portion) of the register file 37 that is the top of the stack. The 8-bit portions of the register file are usable as a stack, and there are instructions in the instruction set of the processor that use the stack. The packet pointer PP 36 identifies one bit in the input data register 38 in the register file read stage 11, where the bit is the first bit of a multi-bit value to be used in the instruction to be executed. In addition to determining the pointer values, the decode stage 10 sends a "number of octets consumed signal" 39 back to the fetch shift selector stage 9. The number of octets consumed depends on the instruction just consumed. If the instruction just consumed involves only one octet, then the decode stage 10 informs the fetch shift selector stage 9 to shift the bits the fetch shift selector stage outputs by one octet. If the instruction just consumed involves two octets, then the decode stage 10 informs the fetch shift selector stage 9 to shift the bits the fetch shift selector stage outputs by two octets. If the instruction just consumed involves three octets, then the decode stage 10 informs the fetch shift selector stage 9 to shift the bits the fetch shift selector stage outputs by three octets. Which octets of the block of information 57 that are output by the fetch shift selector stage 9 are therefore determined by the decode stage 10 using the number of octets consumed signal 39.

The register file read stage 11 stores the input date value 20 into an input data register 38, and sends a signal 56 back to the state machine 6, thereby causing the state machine 6 to transition from the enable clock signal state 22 to the operating state 50. The state machine 6 signals the external circuit that the processor circuit 2 has received the input data value 20 by outputting an operating signal 55. The external circuit can then stop driving input data value 20 onto the input data port 13.

The register file read stage 11 uses the pointer values 33 and 34 from the decode stage to identify the portions of the register file 37 that store the A register value RA 40, and store the B register value RB 41. The register file read stage 11 uses the packet pointer value 36 from the decode stage to identify the portion of the input data register 38 that stores the PCK data value 42 to be used by the instruction. The contents of the register file 37 are output from the register file read stage 11 to the output buffers 59, but the output buffers 59 are disabled. The contents of the register file 37 are therefore not driven onto the output data port 15.

The execute stage 12 receives the RA value 40 (the contents of the A register), the RB value 41 (the contents of the B register) and the PCK data value 42 from the register file read stage 11. The operation to be performed on these values is determined by control signals (not shown) received from the decode stage 10, where the operation is determined by the opcode of the instruction. The instruction set of the processor includes several different types of instructions including: ALU (Arithmetic Logic Unit) instructions, memory access instructions for data, instruction fetch instructions, and processor control instructions. Some of the instructions use the packet pointer 36 and the input data register 38 so that the instruction can obtain and use a part or parts of the input data value 20. Although not illustrated in FIG. 1, there is also another pointer and another register, where the other register stores the initial fetch information value 24. Other instructions use this pointer and this other register to obtain and use a part or parts of the initial fetch information value 24. In addition, flags are included into the input data value 20 as stored in the input data register 38, so these flags are also available for reference by instructions executed by the processor circuit 2. After an instruction has been consumed by the decode stage of the pipeline, the next instruction in the fetched block of information is supplied to the decode stage. The instructions of the fetched block of instructions are executed one by one.

If the execute stage is executing a fetch instruction, then the execute stage supplies fetch information 44 back to the fetch request stage 8 via conductors 45. The execute stage also supplies associated data 46 via conductors 47. In the same way that an externally prompted fetch is prompted by fetch information received on initial fetch information port 14 and input data value received on input data port 13, so too is an internally prompted fetch from the execute stage 12 prompted by fetch information 44 on conductors 45 and data 46 on conductors 47.

As stated above, once the pipeline is operating it does not and cannot fetch instructions unless either: 1) it is prompted to by the receipt of another input data value (and associated initial fetch information value) or, 2) it is prompted to by execution of a fetch instruction. If the processor executes the last instruction of the fetched block of information and there is not a next instruction that has already been fetched, then the processor would hang. Accordingly, in the present example, the last instruction of the fetched block of information 57 is another fetch instruction. This last fetch instruction causes the processor to fetch the next 128-bit block of information from the same section 27 of code. The processor then continues on executing instructions from this second 128-bit block of information. The section 27 of code has a particular function. At the end of the code for performing this function is another fetch instruction, but this fetch instruction is an instruction to fetch the next 128-bit block of code from another table. In this way, the code executed by the processor is modular, with the code of one table causing a fetch into the code of another table, and so forth, from table to table. When fetching into the next table, the offset into the table is typically determined by a characteristic of the input data value 20, as recorded by flags generated by the characterizer. In some embodiments, the flags as determined by the characterizer are incorporated into the input data value 20 as stored in the input data register 38. When execution jumps from one table to the next, the particular section of code that is specifically tailored to data having a characteristic is vectored to (as opposed to vectoring to another section of the table whose code is not for data having the characteristic) due to the fetch instruction having access to the flags.

After the functions of the code have been carried out and execution of the code has traversed from table to table, a final "finished instruction" is executed. Execution of the finished instruction causes the execute stage 12 to assert a finished signal 48 on conductor 49. Asserting of the finished signal 48 causes the state machine 6 to transition from the operating state 50 to the finished state 51. In the finished state 51, the state machine asserts a finished signal 52 that is output from the processor circuit 2. The finished signal 52 as output from the processor circuit 2 is also referred to as the "PE has data to be read" signal. Assertion of the finished signal 52 indicates to an external circuit that the processor circuit 2 has data to supply to the external circuit. In response to the assertion of the "PE has data to be read" signal 52, the external circuit enables the outputting of the data output value 53 onto output data port 15 by asserting a "PE select signal" 58. Assertion of the PE select signal 58 causes the output buffers 59 to be enabled. The buffers 59 then drive the contents of the register file 37 onto the output data port 15 and to the external circuit. Execution of the finished instruction also causes the state machine to stop the clock signal CLK from being supplied to the pipeline. The pipeline therefore stops clocking, and power consumption is reduced.

While the PE select signal 58 is asserted and the output data value 53 is being driven onto the output data port 15, the external circuit reads the output data value 53 from the output data port 15. The external circuit then deasserts the PE select signal 58 thereby disabling driver 59, and asserts an "output data was read" signal 54. Assertion of the "output data was read signal" 54 causes the state machine 6 to transition to the idle state 16. In the idle state 16, the state machine asserts the idle signal 18. At this point, the pipeline is not being clocked, but it is ready to receive another input data value and another associated initial fetch information value.

Figure 2:
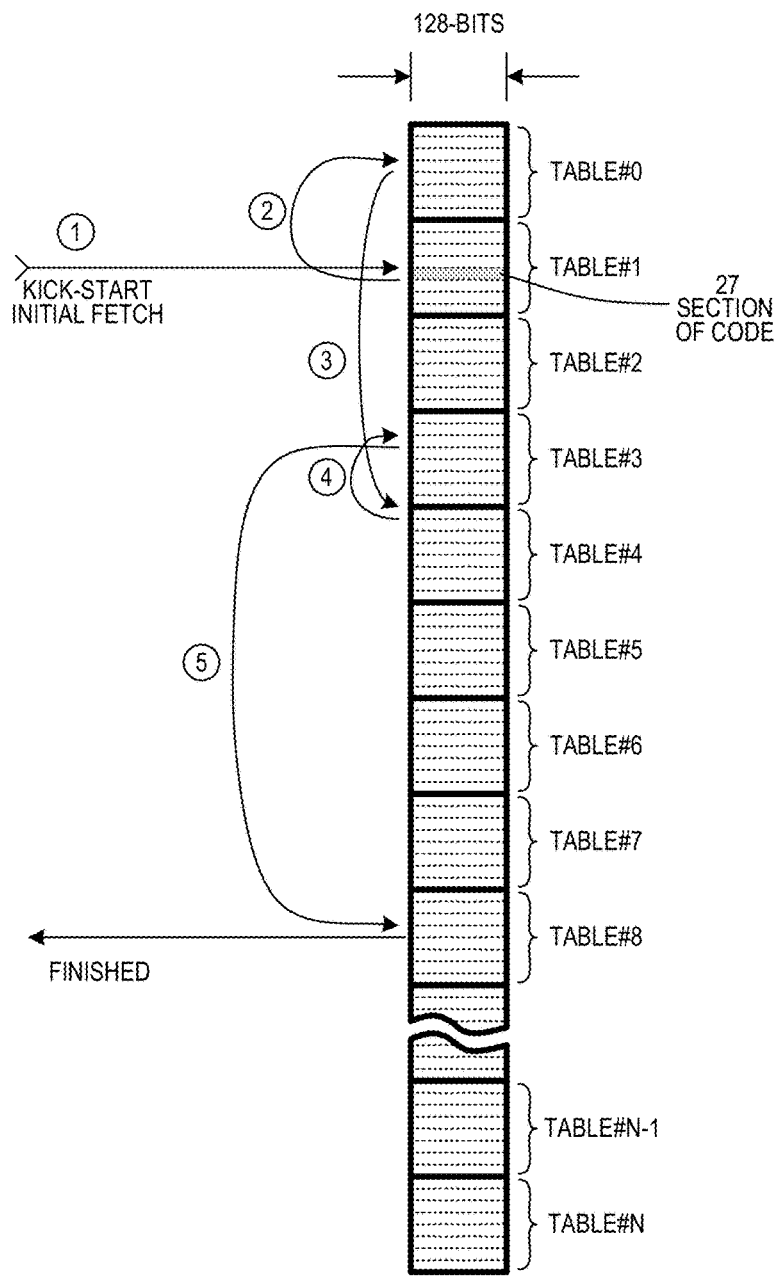
FIG. 2 is a diagram of the tables of code stored in the external memory system 3 of FIG. 1.

FIG. 2 is a diagram of the program code stored in the external memory 3. The memory is organized as many uniquely addressable 128-bit blocks of information. There are many such 128-bit blocks of information in one section of code, and there are many sections of code in one table, and there are N tables stored in the memory. In the illustrated example, the initial fetch (the one initially prompted from outside the processor by incoming data) is identified by the circled numeral "1". The incoming initial fetch information causes the pipeline to start clocking. The resulting first fetch from the external memory has a base address 28 that identifies the first word 57 of TABLE#1. The table number given by the initial fetch information value 24 is translated by the lookup table circuit 30 into the base address value 28 that is then used in the memory request 26. The offset 29 from the beginning location of TABLE#1 identifies the beginning 128-bit block 57 of section 27 of code. This offset 29 is specified by the initial fetch information. Once this section 27 of code has been executed, a fetch instruction causes code execution to jump to the fourth section of TABLE#0. This is identified in FIG. 2 by the circled numeral "2". After execution of this section of code, a fetch instruction causes code execution to jump to the first section of the code of TABLE#4. This is identified in FIG. 2 by the circled numeral "3". The instruction fetches that causes the fourth and fifth jumps are identified in FIG. 2 by the circled numerals "4" and "5". At the end of the fourth section of code of TABLE#8 is a "finished" instruction. This finished instruction causes the pipeline to stop clocking, and causes the external circuit to be signaled that the processor circuit 2 has an output data value 53 to be read on output data port 15.

Each section of code is typically an amount of code that is specialized to do a particular discrete task on input data having a particular characteristic or characteristics. In one simplified illustrative example, a first section of code does VLAN and MAC address processing, a second section of code does IP header analysis processor, a third section of code does tunnel decapsulation processing, and a fourth section of code does inner header processing. Execution of a fetch instruction at the end of the first section references an IP header version flag (a flag in the initial fetch information value 24 that indicates whether packet data is IPv4 or IPv6), and as a result of this flag fetches code at the beginning of the second section. Execution of a fetch instruction at the end of the second section references a header value in the input data value 20 (the header value indicates whether the packet is a tunnel packet, and if so what kind of tunnel), and as a result of this header value fetches code at the beginning of the third section. Execution of a fetch instruction at the end of the third section references a set of data values stored in memory system 3 (the set of data values indicates whether the packet data is an ethernet frame or an IP packet), and as a result of this set of data values fetches code at the beginning of the fourth section. Another processor (not shown) preloads the set of data values into the memory system 3 so that the set of data values is later usable by processor circuit 2 executing a fetch instruction to determine which section of code to execute next. Memory system 3, in addition to storing blocks of information of code, stores many such sets of data values.

In one example, the processor circuit 2 is one of many such processor circuits (also referred to picoengines) in a pool (also referred to as a picoengine pool). The output data values from the processor circuits are read out of the pool one by one, and are stored in an external FIFO. An external output data reader circuit supplies a PE select signal to each of the processor circuits 2, but it only asserts one PE select signal going to one processor circuit at a time. The currently selected processor circuit is made to output its output data value onto a common output bus, and the output data value is communicated via this bus to the FIFO. After the output data value is stored in the FIFO, the output data reader circuit deasserts the PE select signal and asserts another PE select signal, so that another of the processor circuits will then output its output data value onto the common output bus. In this way the output data values from processor circuits are read, one by one. Each output value includes a buffer pool number value that indicates a particular processor (an ME microengine processor) that will perform further processing on the input data value. A first particular type of input data values will typically be further processed by a first ME processor, whereas a second particular type of input data values will typically be further processed by a second ME processor, and so forth. For additional information on a picoengine pool and an output data reader, see: U.S. patent application Ser. No. 14/251,592, entitled "Picoengine Multi-Processor With Task Management", filed Apr. 12, 2014, by Gavin J. Stark (the entire subject matter of which is incorporated herein by reference).

Figure 3:
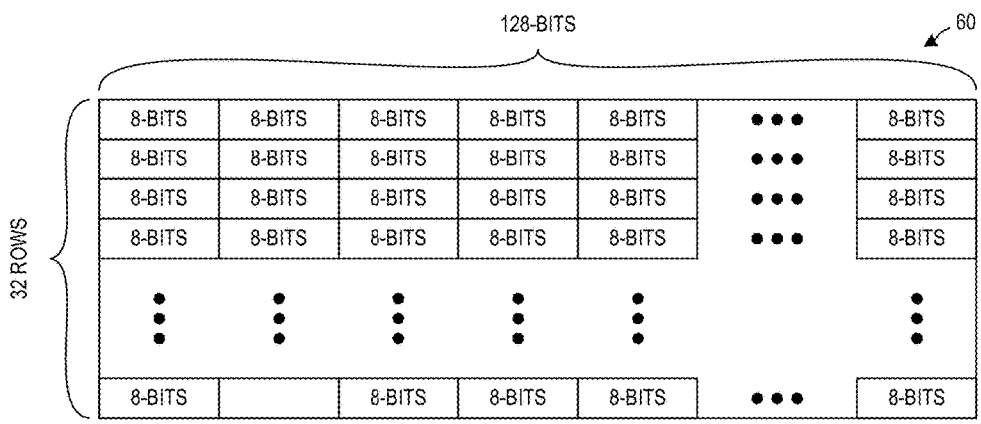
FIG. 3 is a diagram of one section of code in the external memory system of FIG. 1.

FIG. 3 is a diagram of one section 60 of code. Each 128-bit block of information (one row in the diagram) includes 16 octets. In this example, there are thirty-two 128-bit blocks of information in the section 60.

Figure 4:
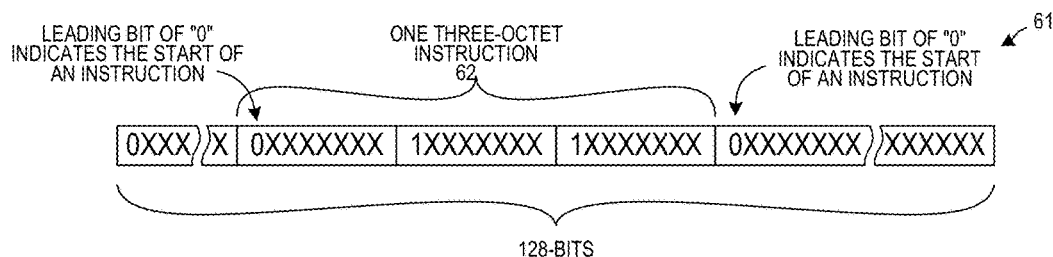
FIG. 4 is a diagram of one 128-bit block of information within the section of code of FIG. 3.

FIG. 4 is a diagram of one 128-bit block 61 of information, and one three-octet instruction 62 within the block 61. The first octet of each instruction starts with a "0" bit. The second octet of a multi-octet instruction starts with a "1" bit. The third octet of a three-octet instruction starts with a "1" bit. The decode stage 10 uses these leading bits of the octets to parse the octets of a block of information and to identify the boundaries between instructions.

Figure 5:
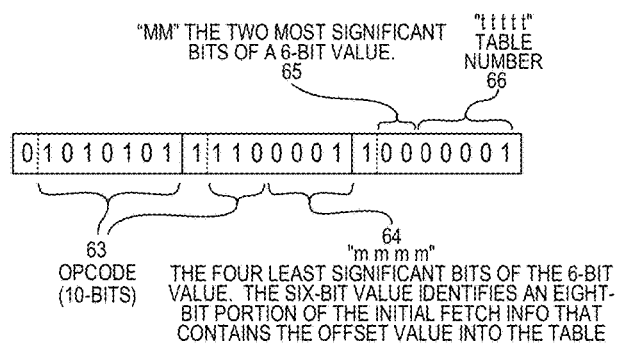
FIG. 5 is a diagram of a fetch instruction in which the offset value is a value in the initial fetch information value.

FIG. 5 is a diagram that illustrates a fetch instruction where the offset value is a value in the initial fetch information value. The instruction is a three-octet instruction. The opcode 63 is ten bits. The four "mmmm" bits 64 and the two "MM" bits 65 together form a six-bit value, where this six-bit value identifies one eight-bit portion of the initial fetch information value that contains the offset value. Each eight-bit portion of the initial fetch information value is numbered, and the value "MMmmmm" is the number of one of these eight-bit portions. The five "ttttt" bits 66 indicate the table number. As mentioned above, in one example the table number is translated by the lookup table circuit 30 into the base address value where the table starts in memory.

Figure 6:
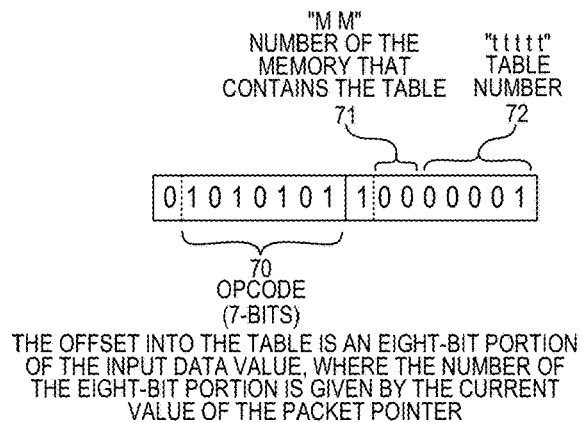
FIG. 6 is diagram of a fetch instruction in which the offset value is a value in the input data value.

FIG. 6 is a diagram that illustrates a fetch instruction where the offset value is a value in the input data value. The instruction is a two-octet instruction. The opcode 70 is seven bits. The two "MM" bits 71 indicate the memory that contains the table. In the present example, memory system 3 is identified by an "MM" value of "00". The five "ttttt" bits 72 indicate the table number. The packet pointer identifies one of the eight-bit portions of the input data value, and this eight-bit portion is used as the offset value.

Figure 7:
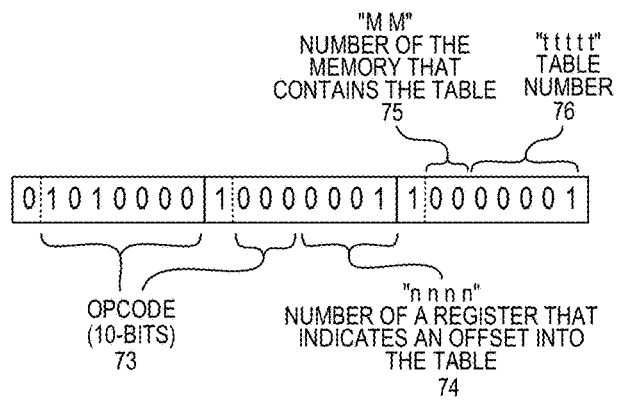
FIG. 7 is diagram of a fetch instruction in which the offset value is in a specified register of the register file of the processor.

FIG. 7 is a diagram that illustrates a fetch instruction where the offset value is in a specified register in the register file 37. The instruction is a three-octet instruction. The opcode 73 is ten bits long. The four "nnnn" bits 74 indicate the number of the register in the register file 37 that contains the offset value into the table. The two "MM" bits 75 indicate the memory that contains the table to be fetched from. The five "ttttt" bits 76 specify the table number.

Figure 8:
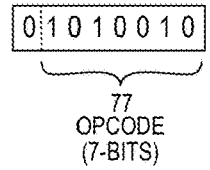
FIG. 8 is a diagram of a fetch more instruction.

FIG. 8 is a diagram that illustrates a fetch more instruction. This instruction is one octet in length, and only contains a seven-bit opcode 77. The instruction causes a fetch of the next 128-bit block of information that is located in the memory immediately after the last 128-bit block of information that was fetched. The memory from which the fetch is conducted is the same memory from which the last fetch was conducted.

FIG. 9 is a diagram of pop stack absolute instruction. As mentioned above, the registers of the register file 37 are used as a stack. The opcode is a combination of the six bits 91 and the three bits of 93. The ALU operation is determined by the four-bit code 96, 97. In the present example, the ALU operation is an add operation. The absolute pointer value 92 points to a specific register of the register file 37. The absolute pointer value 92 is "absolute" in that it points to a particular register, regardless of the value of the stack pointer. The term "absolute" is used to distinguish a relative pointer value that might identify a register in relation to another register, such as the register at the top of the stack. Each register of the register file is assigned a number, and the absolute pointer value is the number of the particular register. In the pop stack absolute instruction, the value stored in the specific register (pointed to by the absolute pointer value 92) is added to the value popped off the top of the stack, and the result is written back into the specific register. The values of the carry and zero flags 67 and 68 are used as appropriate for the ALU operation called out by the four-bit code 96, 97, but due to the "flag don't touch" bit being a "1" the value of the flags (carry flag and zero flag) are not changed due to the execution of the instruction. The instruction is a conditional instruction in that the operation is only performed if the predicate condition is true, as specified by the three predicate bits 94.

FIG. 10 is a diagram that sets forth the predicate codes indicated by the three predicate bits.

FIG. 11 is a diagram that illustrates the finished instruction. This instruction is one octet in length and includes a seven-bit opcode 78. As mentioned above, execution of the finished instruction causes the pipeline to stop clocking, and causes the state machine to transition to the finished state. In the finished state, the state machine causes the processor circuit 2 to assert the "PE has data to read" signal 52.

Figure 12:
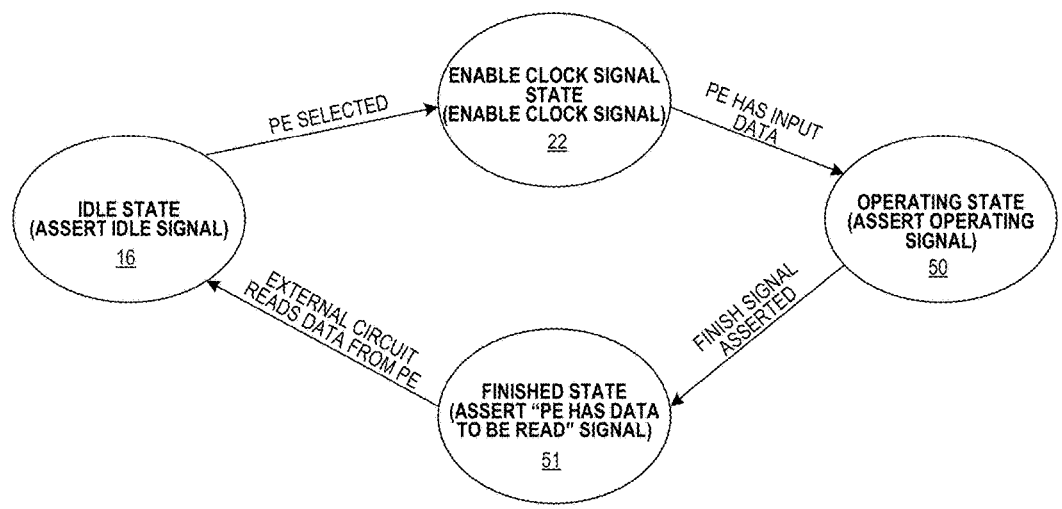
FIG. 12 is a state diagram for the clock control state machine 6 of the processor 4 of FIG. 1.

FIG. 12 is a state diagram of the state machine 6. The four states are the idle state 16, the enable clock signal state 22, the operating state 50, and the finished state 51. Assertion of the start signal 21 (also called the "PE select signal") causes the state machine to transition from the idle state to the enable clock signal state. Assertion of the operating signal 55 (also called the "PE has read the data" signal) causes the state machine to transition from the enable clock signal state to the operating state. Assertion of the finished signal 48 from the execute stage causes the state machine to transition from the operating state to the finished state. Assertion of the "output data was read" signal 54 causes the state machine to transition from the finished state to the idle state.

Figure 13:
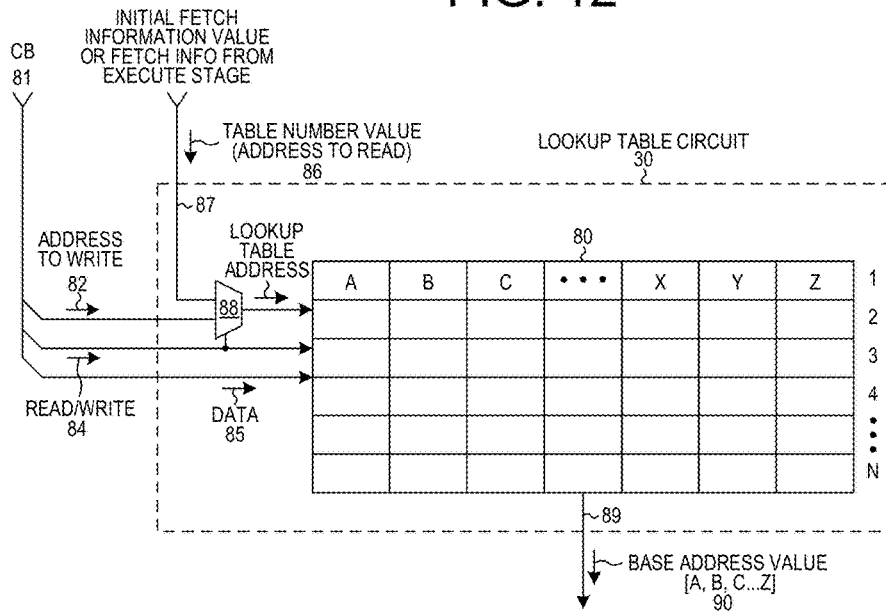
FIG. 13 is a simplified diagram of one possible implementation of the lookup table circuit 30 within the fetch request stage 8 of FIG. 1.

FIG. 13 is a simplified diagram of the lookup table circuit 30 in the fetch request stage 8 of FIG. 1. The data contents of the memory portion 80 can be written via a control bus CB 81. An address 82 of a memory location in the memory portion 80 is supplied via lines 83, and the read/write signal 84 is set to indicate a write operation, and the data 85 to be written is supplied via the control bus 81 to the memory portion 80. In this way, the contents of the addressed memory location of the memory portion 80 are pre-loaded and setup before processor circuit 2 operation, or during downtimes during which the processor circuit 2 is not being used. To perform a table number value to base address value lookup, the table number 86 is supplied to the lookup table circuit 30 via input conductors 87 when the read/write control signal 84 is set to indicate a read operation. The read/write signal 84 controls the address multiplexer 88. The multi-bit content of the memory location addressed by the table number value is then output from the lookup table circuit 30 onto output conductors 89 as the base address value 90.

Figure 14:
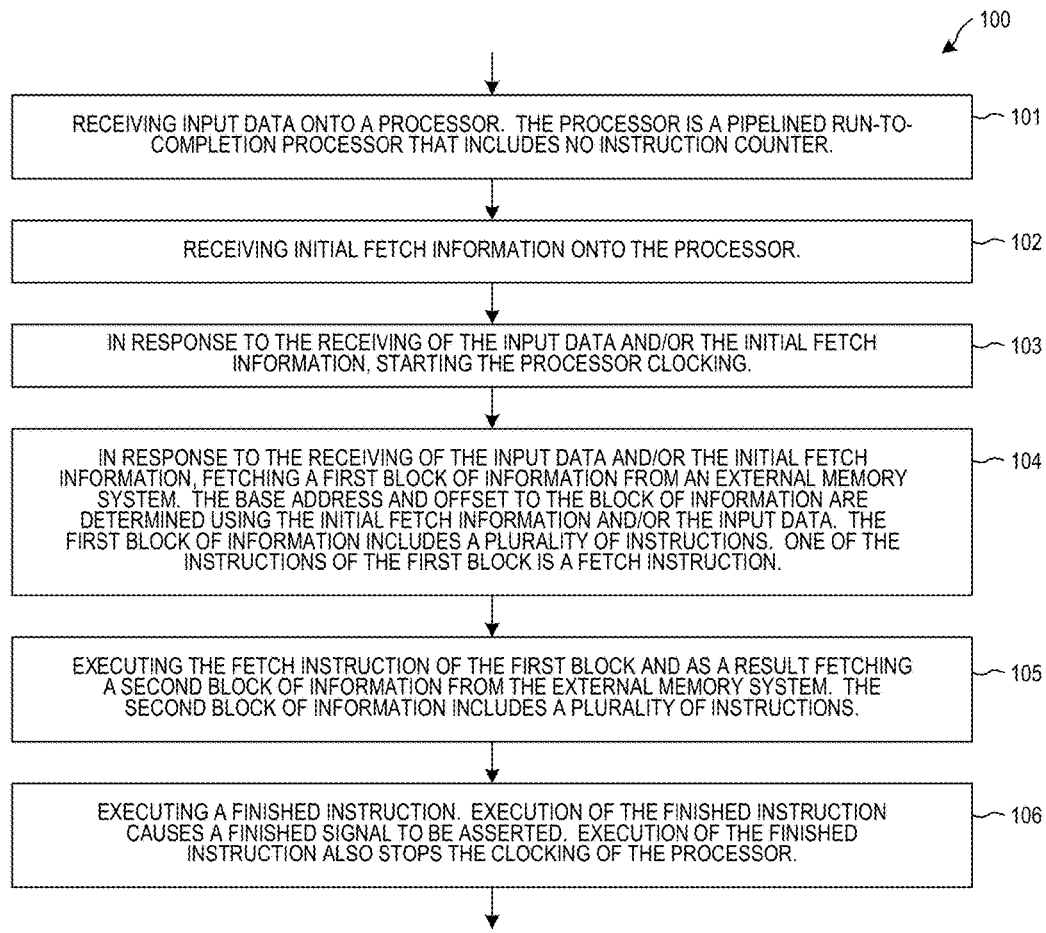
FIG. 14 is a flowchart of a method 100 in accordance with one novel aspect.

FIG. 14 is a flowchart of a method 100 in accordance with one novel aspect. An input data value is received (step 101) onto a pipelined run-to-completion processor. In one example, the input data value is the input data value 20 of FIG. 1. The processor includes no instruction counter. An initial fetch information value is also received (step 102) onto the processor. In one example, the input fetch information value is the initial fetch information value 24 of FIG. 1. In response to the receiving of the input data value and/or the initial fetch information value, the processor starts clocking (step 103). In the example of FIG. 1, the clock signal CLK is supplied to the pipeline. In response to the receiving of the input data value and/or the initial fetch information value, the processor fetches (step 104) a first block of information from an external memory system. The base address value and the offset value that together address the beginning of the block of information are determined using the initial fetch information value and/or the input data value. In one example, the initial fetch information value includes a table number value that is then converted into the base address value. In one example, the initial fetch information value includes a number that is then converted into the offset value. Depending on the particular embodiment, the number that is part of the initial fetch information value either is the offset value, or is a number that is then converted into the offset value. As a result of the first fetch, the first block of information is received onto the processor. The first block of information includes a plurality of instructions. One of the instructions is a fetch instruction. This fetch instruction is executed (step 105) by the processor and as a result a second block of information is retrieved from the external memory system. The second block of information, like the first block, includes a plurality of instructions. Instructions of the second block of information are then executed by the processor. The second block of information may be the next block of information in a section of code in the same table, or may be a nonadjoining block of information in the same table, or may be a block of information in another table. Execution of the program of instructions moves from section to section, and table to table, with the code of each section being specialized to handle a particular aspect of processing of the input data value. At the end of the program of instructions is a finished instruction. Execution of the finished instruction (step 106) causes a finished signal to be output from the processor and causes the clocking of the processor to stop. An external circuit can then read the output data value.

Although in the specific embodiment of FIG. 1, the lookup table circuit 30 is disposed in the fetch request stage 8, in other embodiments the lookup table circuit that converts a table number value into a base address value is disposed in the memory system 3. In still other embodiments, there is no table number to base address lookup table circuit. If a lookup table circuit is disposed in the memory system 3, then the memory request 26 as received onto the memory system 3 may include the table number value. The lookup table circuit of the memory system 3 then uses the table number value to determine the base address value, and the base address value along with the offset value is then used to read the block of information from the memory of the memory system. In the same way that a table number value can be converted into a base address value by a lookup table circuit located in the fetch request stage 8, so too can another value (for example, a flag value or flag values) in the initial fetch information value 24 be converted by a lookup table circuit in the fetch request stage 8 into the offset value. Similarly, a lookup table circuit that converts a flag value or values into the offset value can be located in the memory system 3. The contents of these lookup table circuits can be loaded by the processor circuit itself, or in other embodiments can be loaded via a separate control bus (CB).

In one example, to realize an integrated circuit embodiment of the pipelined run-to-completion processor 4 of FIG. 1, the function of the each circuit block of the processor 4 is described in a hardware description language (for example, Verilog or VHDL). A commercially available hardware synthesis program (for example, Synopsis Design Compiler) is then employed to generate digital logic circuitry from the hardware description language description, where the synthesized digital logic circuitry performs the function described by the hardware description language. The processor 4 is realized in this way to be a small circuit of about ten thousand equivalent gates. An embodiment of processor 4 may be made available by one company as a predesigned block of circuitry that is then incorporated into another company's integrated circuit design as a general purpose block. Such a predesigned block of IP is sometimes referred to in the art as a block of "IP". A hardware designer who incorporates the predesigned block of IP into a larger integrated circuit design need not understand or be aware of the internal structure and operation of the pre-designed block, but rather interfaces to the pre-designed block in accordance with an interface description supplied by the original designer of the predesigned block. Rather than being supplied as a block of IP to be incorporated into another integrated circuit, the novel processor 4 can be supplied to end customers as a separate discrete integrated circuit of general utility in data processing applications.

Although certain specific embodiments are described above for instructional purposes, the teachings of this patent document have general applicability and are not limited to the specific embodiments described above. The particular interface signaling and interface logic of FIG. 1 that interfaces the pipelined run-to-completion processor 4 to the external circuit that kick-starts the processor and that reads output data values, as described above in connection with FIG. 1, is just one illustrative example. Other suitable interface circuits are employed in other embodiments. Input data values going into the processor and output data values coming out of the processor may be buffered, for example using FIFOs. Accordingly, various modifications, adaptations, and combinations of various features of the described embodiments can be practiced without departing from the scope of the invention as set forth in the claims.

What is claimed is:

1. A pipelined processor, comprising:
an input data port;
a fetch stage that fetches instructions from an external memory system, wherein the fetch stage is prompted to fetch from the external memory in response either: 1) to a receiving of input data onto the pipelined processor via the input data port, or 2) to a receiving of fetch information from another stage as a result of an execution of a fetch instruction by the pipelined processor, wherein the input data and the fetch information does not include a clock signal or a signal output from a counter circuit, and wherein the pipelined processor only fetches instructions in response to either receiving input data onto the pipelined processor via the input data port or as a result of execution of a fetch instruction;
a decode stage that decodes instructions fetched from the external memory;
a register file read stage that comprises a register file and an input data register, wherein the input data register is loaded with input data from the input data port; and
an execute stage coupled to the register file read stage, wherein the execute stage can output fetch information to the fetch stage such that the fetch stage is prompted to perform a fetch from the external memory, wherein the pipelined processor comprises no instruction counter.

2. The pipelined processor of claim 1, wherein the fetch stage, the decode stage, the register file read stage, and the execute stage are parts of a pipeline, the pipelined processor further comprising:
a clock control state machine that starts and stops a clocking of the pipeline.

3. The pipelined processor of claim 2, wherein the clock control state machine starts a clocking of the pipeline in response to a receiving of input data onto the pipelined processor via the input data port.

4. The pipelined processor of claim 2, wherein the clock control state machine stops a clocking of the pipeline upon the pipeline processor having executed all the instructions it has fetched from the external memory system.

5. The pipelined processor of claim 2, wherein the clock control state machine stops a clocking of the pipeline in response to execution by the pipeline of a finished instruction.

6. The pipelined processor of claim 1, wherein while the pipelined processor is executing instructions the fetch stage does not fetch any instruction due to a receiving of input data onto the pipelined processor via the input data port.

7. A pipelined processor adapted to be coupled to a memory system, comprising:
an input data port;
an initial fetch information port;
an output data port;
a fetch stage that issues memory requests to the memory system, wherein the fetch stage is prompted to issue a memory request in response to receiving fetch information from the initial fetch information port, wherein the fetch information does not include a clock signal or a signal output from a counter circuit, and wherein the fetch stage is prompted to issue a memory request in response to receiving fetch information supplied from another stage of the pipelined processor;
a fetch shift selector stage that receives a block of instructions from the memory system in response to each fetch request issued by the fetch stage, wherein the fetch shift selector stage stores a block of instructions and outputs one selected instruction from the block of instructions;
a decode stage that controls the fetch shift selector stage so that the fetch shift selector stage outputs said one selected instruction, wherein the decode stage decodes the selected instruction as output from the fetch shift selector stage, and wherein the decode stage maintains an A register pointer, an B register pointer, and an input data pointer;
a register file read stage that comprises a register file and an input data register, wherein the input data register is loaded with input data from the input data port, wherein the register file read stage uses the A register pointer, the B register pointer, and the input data pointer to read various parts of the register file and the input data register, and wherein register file read stage outputs contents of the register file onto the output data port; and an execute stage that receives said various parts from the register file read stage, wherein the execute stage includes an ALU (Arithmetic Logic Unit), wherein the execute stage can output fetch information to the fetch stage such that the fetch stage is prompted to output a memory request, wherein the pipelined processor comprises no instruction counter, and wherein the pipelined processor only performs an instruction fetch in response to receiving fetch information through the initial fetch information port or due to execution by the pipelined processor of a fetch instruction that is decoded by the decode stage.

8. The pipelined processor of claim 7, wherein the input data port is a plurality of conductors that extends to the register file read stage, wherein the initial fetch information port is a plurality of conductors that extends to the fetch request stage, and wherein the output data port is a plurality of conductors that extends from the execute stage.

9. The pipelined processor of claim 7, wherein the fetch information received on the initial fetch information port is a fetch instruction.

10. The pipelined processor of claim 7, further comprising:
a finished signal conductor, wherein execution of an finished instruction by the pipelined processor results in the execute stage asserting of a finished signal onto the finished signal conductor.

11. The pipelined processor of claim 10, wherein execution of the finished instruction also causes a clock signal supplied to at least one stage of the pipelined processor to stop clocking.

12. The pipelined processor of claim 7, wherein a receiving of fetch information onto the pipelined processor via the initial fetch information port causes a clock signal supplied to at least one stage of the pipelined processor to start clocking.

13. The pipelined processor of claim 7, wherein some instructions fetched by the pipelined processor from the memory system are longer than other instructions fetched by the pipelined processor.

14. The pipelined processor of claim 7, wherein execution of a fetch instruction by the pipelined processor results in an issuing of a memory request, wherein the memory request includes a base address of a table and an offset value, wherein the base address of the table is determined by an opcode of the fetch instruction, and wherein the offset value is determined by the input data received onto the pipelined processor along with the fetch instruction.

15. The pipelined processor of claim 7, wherein execution of a fetch instruction by the pipelined processor results in a fetching of a block of information, wherein the block of information is located in the memory system at a location identified by a base address and an offset value, wherein the base address of the table is determined by an opcode of the fetch instruction, and wherein the offset value is specified by a portion of the input data received onto the pipeline processor along with the fetch instruction.

16. The pipelined processor of claim 7, wherein execution of a fetch instruction by the pipelined processor results in a fetching of a block of information from the memory system, wherein the block of information is located at a location in the memory system at a location identified by a base address and an offset value, wherein the base address is specified by a first portion of the input data received onto the pipelined processor along with the fetch instruction, and wherein the offset value is specified by a second portion of the input data received onto the pipelined processor along with the fetch instruction.

17. The pipelined processor of claim 7, wherein the fetch information comprises a table number and an amount of data, wherein a memory request includes a base address of a table, and wherein the memory request further includes an offset value determined at least in part of the amount of data of the fetch information.

18. The pipelined processor of claim 7, wherein input data received onto the pipelined processor via the input data port determines the fetch information received onto the pipelined processor via the initial fetch information port.

19. The pipelined processor of claim 18, wherein the fetch information is determined by: 1) generating a set of flags that characterize the input data, and 2) using the set of flags to perform a memory lookup such that a memory outputs the fetch information.

20. A processor comprising:
means for fetching blocks of information from a memory system external to the processor without the use of an instruction counter, wherein the means only fetches blocks of information from the memory system in response to either a receiving of fetch information onto the processor from an external source or to a receiving of fetch information from the execute stage, wherein the fetch information does not include a clock signal or a signal output from a counter circuit, and wherein the processor includes no instruction counter and the means fetches blocks of information without use of any instruction counter;

a decode stage coupled to the means, wherein the decode stage can decode a fetch instruction;
a register file read stage coupled to the decode stage; and
an execute stage coupled to the register file read stage, wherein the execute stage executes the fetch instruction by outputting fetch information to the fetch request stage thereby prompting the means to fetch a block of information.

21. The processor of claim 20, wherein the means comprises:
a fetch request stage that outputs memory requests to the memory system; and
a fetch shift selector stage that receives blocks of information from the memory system.

22. The processor of claim 20, wherein execution of a fetch instruction by the processor results in a fetching of a block of information from the memory system, wherein the block of information is located in the memory system at a location identified by a base address and an offset value, wherein the base address is determined by an opcode of the fetch instruction, and wherein the offset value is specified by a portion of the input data received onto the processor along with the fetch instruction.

23. The processor of claim 20, wherein execution of a fetch instruction by the processor results in a fetching of a block of information from the memory system, wherein the block of information is located in the memory system at a location identified by a base address and an offset value, wherein the base address is specified by a first portion of the input data received onto the processor along with the fetch instruction, and wherein the offset value is specified by a second portion of the input data received onto the processor along with the fetch instruction.

24. The processor of claim 20, further comprising:
a state machine that supplies a clock signal to the means, the decode stage, the register file read stage, and the execute stage, wherein the state machine starts the clock signal clocking in response to the processor receiving fetch information onto the processor from the external source.

25. The processor of claim 24, wherein the state machine stops of the clock signal clocking in response to the processor executing a finished instruction.

26. The processor of claim 24, wherein the state machine stops the clock signal clocking as a result of the processor having executed all instructions fetched from the memory system.

* * * * *